United States Patent [19]
DiMatteo

[11] 3,932,923
[45] Jan. 20, 1976

[54] METHOD OF GENERATING AND CONSTRUCTING THREE-DIMENSIONAL BODIES

[75] Inventor: Paul L. DiMatteo, Huntington, N.Y.

[73] Assignee: Dynell Electronics Corporation, Melville, N.Y.

[22] Filed: Oct. 21, 1974

[21] Appl. No.: 516,373

[52] U.S. Cl. .............. 29/407; 29/428; 29/433; 29/525; 29/526; 156/253; 156/264; 156/512
[51] Int. Cl.² ................................. B23Q 17/00
[58] Field of Search ........... 29/407, DIG. 1, DIG. 37, 29/156.8 D, 156.8 B, 428, 433, 458, 525, 526; 156/264, 512, 253

[56] References Cited
UNITED STATES PATENTS

| | | |
|---|---|---|
| 2,903,390 | 9/1959 | Kojima........................... 29/407 X |
| 3,348,300 | 10/1967 | Lindgren........................ 29/407 X |
| 3,391,449 | 7/1968 | Briles............................. 29/522 |
| 3,490,134 | 1/1970 | DeBisschop.................... 29/433 X |
| 3,548,486 | 12/1970 | Foote............................. 29/407 X |
| 3,748,948 | 7/1973 | Schmitt.......................... 85/37 X |

Primary Examiner—Victor A. DiPalma
Attorney, Agent, or Firm—Max Fogiel

[57] ABSTRACT

An arrangement for generating and constructing three-dimensional surfaces in which the surface or body to be constructed is subdivided into planar elements. The contours or outlines of the planar elements correspond to respective cross-sections of the surface or body to be constructed. The planar elements are stacked against each other for constructing the surface or body.

8 Claims, 15 Drawing Figures

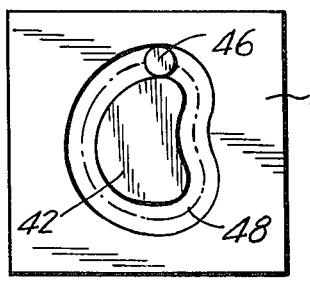
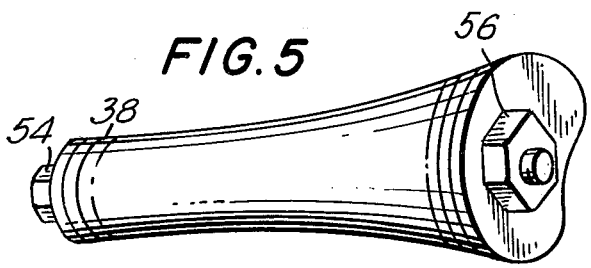
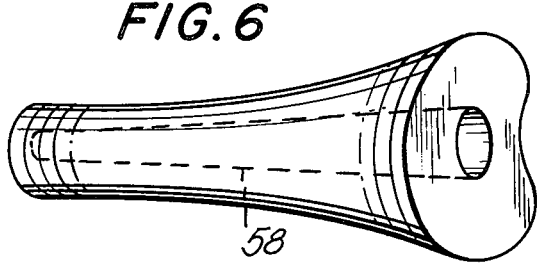
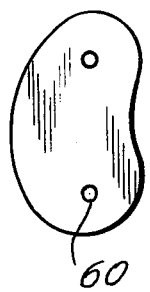
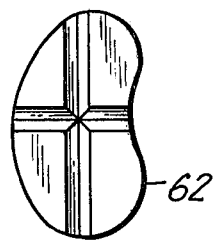
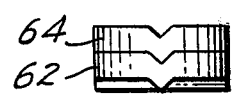
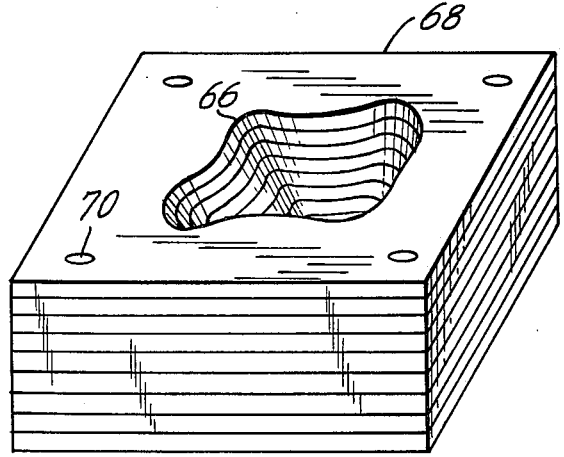

3,932,923

METHOD OF GENERATING AND CONSTRUCTING THREE-DIMENSIONAL BODIES

BACKGROUND OF THE INVENTION

In generating and constructing three-dimensional surfaces or bodies which have cross-sections that vary severely in shape along the surface to be constructed, it is particularly difficult to produce such surfaces with machine tools and machining operations, for example. Thus, if the surface to be constructed or reproduced possesses a particularly warped surface as present, for example, in propellers, three-dimensional cams, air foils, the machining of such surfaces with the application of machine tools involves labourious, tedious and therefore costly processes. Such surfaces are often produced with numerically controlled machine tools requiring controls in three-dimensions and corresponding instructions derived from computerized data based on complex calculations which must take into account the three-dimensional movement of the tool, together with the dimensions of the tool itself. Furthermore, machining of surfaces or bodies become particularly difficult if the surfaces to be constructed have substantially small cross-sectional areas, as, for example, if a hair is to be reproduced and fabricated. The machine tool, moreover, can often not reach recessed portions or cutouts in a surface or body.

Accordingly, it is an object of the present invention to provide an arrangement for generating and constructing three-dimensional surfaces and bodies in a simple and economical manner.

Another object of the present invention is to provide an arrangement of the foregoing character which is applicable to external as well as internal surfaces.

A further object of the present invention is to provide an arrangement, as described, in which the surfaces and bodies to be constructed have varying cross-sections and do not require axes of symmetry.

SUMMARY OF THE INVENTION

The objects of the present invention are achieved by providing an arrangement in which the surface or body to be constructed is subdivided into planar elements. These planar elements are cut or formed to correspond to the contour or shape of the surface or body to be generated. Each planar element, furthermore, corresponds to a respective cross-section of the surface or body.

After forming the individual planar elements, these are assembled and stacked against each other to generate the surface or body. The surface may have a warped contour as is present for example, in propellers, air foils, three-dimensional cams, and predetermined forming dies in punch-presses. The surfaces may be external or internal, and they do not require that they be symmetrical about an axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

FIG. 3 is a plan view and shows the formation of a planar element from a sheet member by a milling cutter;

FIG. 5 is a perspective view and shows an embodiment for holding stacked planar elements against each other by bolting means;

FIG. 6 is a perspective view and shows an embodiment for holding stacked planar elements against each other by means of a tapered rod device;

FIG. 7 is an end view and shows an embodiment for locating planar elements relative to each other by means of perforations therethrough;

FIG. 8 is an end view of a planar element and shows a still further embodiment for locating and retaining the planar elements in place by means of a projection and notch arrangement;

FIG. 9 is a side view of two adjacent elements held together by means of the embodiment of FIG. 8; and FIG. 10 is a perspective view and shows the combination of planar elements to form dies for use in pressing machinery;

DESCRIPTION OF THE PREFERRED EMBODIMENTS

Figures 1, 2, 4:
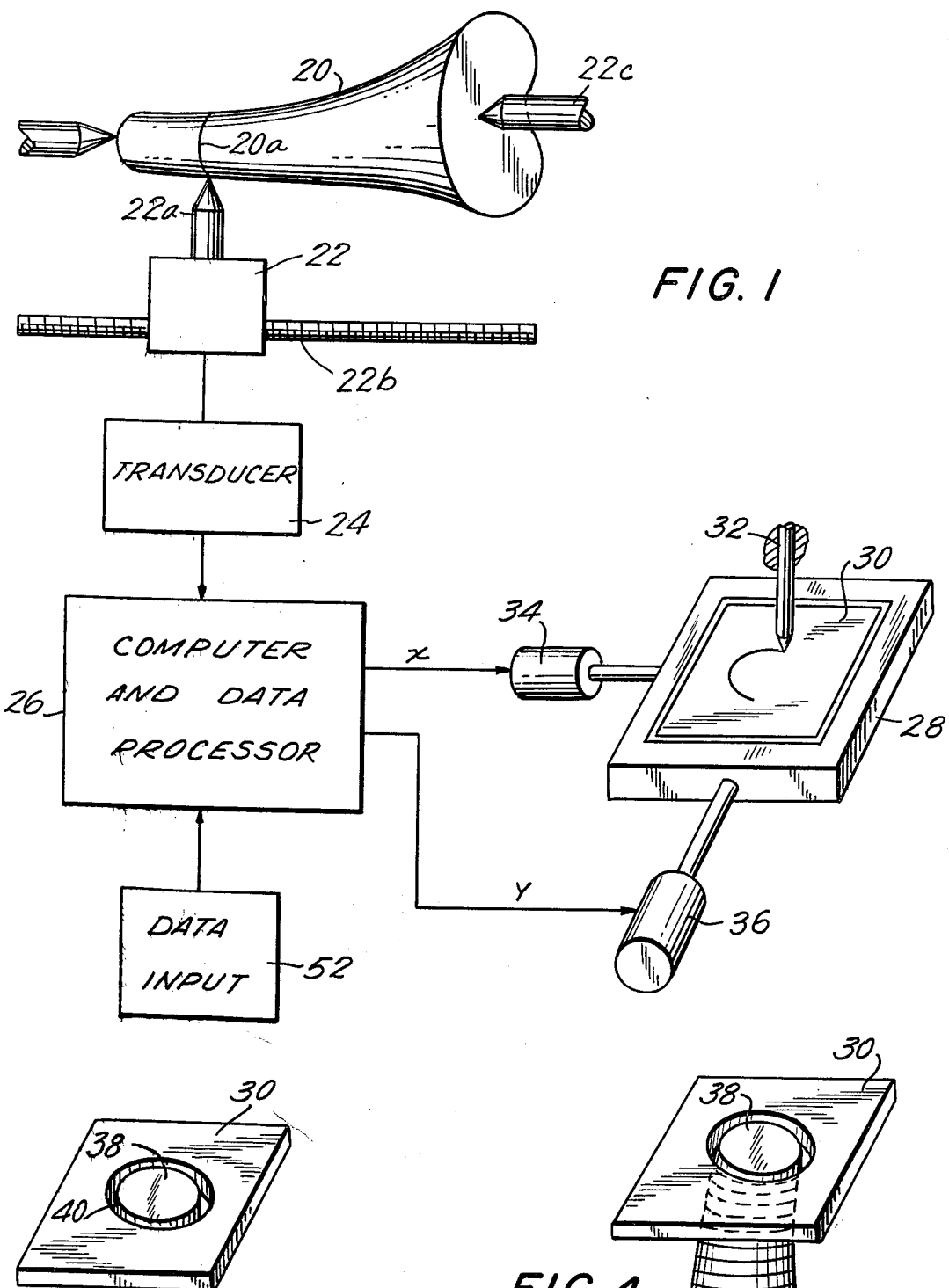
FIG. 1 is a schematic diagram of the arrangement for generating and constructing surfaces and bodies, in accordance with the present invention.
FIG. 2 is a perspective view and shows the construction of a planar element after having been cut from a sheet member.
FIG. 4 is a perspective view and shows the process of stacking planar element for generating a predetermined surface or body.

Referring to the drawing and in particular to FIG. 1, there is shown a surface or body 20 in the form of a cam, for example, which has a substantially severely varying cross-section along the cam, and does not possess any axis of symmetry. If such a cam 20 were to be fabricated for use in automatic production machinery, for example, the cam would have to be constructed of metal, and this procedure would require either a significant amount of manual workmanship or complex numerically-controlled machine tools.

To produce such a member 20 with a complex surface, however, in accordance with the present invention, the member 20 may be constructed of a substantially soft workable material, and its surface outline may be sensed by a contour follower 22. Such contour followers 22 are well known in the art and may be provided with a sensing head 22a moved along on a rail 22b, while the member 20 is rotated, for example, on gimbals or centers 22c. Contour followers such as the one 22 are well known in the art, and for this reason is not described here further.

In sensing the surface of the member 20, the contour follower 22 provides a signal in either mechanical or electrical form, corresponding to the contour of the surface of the member 20. This signal is transformed by a transducer 24, so as to make this signal suitable for application to a computer or data processor 26. The computer 26 receives the data sensed by the device 22 at successive cross-sections of the member 20, and translates that data into X-Y motions of a table 28. The latter holds a sheet member 30, corresponding to a predetermined crosssection of the member 20. To cut out the respective planar element from the sheet member 30, the latter is moved along X-Y directions relative to a cutting device 32. The cutting device 32 may be in the form of a laser beam, for example, a milling cutter, a sawing device, or other cutting means suitable for this purpose and known in the art.

The movement of the table 28 in X-Y directions may be achieved by the use of servo-motors 34 and 36 driven by instructions from the computer in the X and Y directions, respectively. The use of signals such as derived from a computer 26 to drive servo-motors 34 and 36 to position a table 28 in X-Y directions is well known in the art, and is for this reason not described in further detail here.

The member 20 can be in the form of, for example, any other article such as a sculpture having a substantially complex surface structure corresponding to a human figure. The contour follower 22 can be a mechanical device, an electronic sensing means, or an optical sensing device. The contour following or sensing apparatus is well known in the art, and many different designs for such sensing apparatus are commercially available.

The computer and data processor 26 serves to translate the data derived from the unit 22, into rectangular displacements X-Y suitable for correspond a table or platen 28 in those directions relative to a cutter 32. If a substantially pointed laser beam device 32 is used as the cutting means, then the sheet member 30 after cutout appears is shown in FIG. 2.

Thus, after cutout, a planar element 38 will have been severed from the sheet member 30, and this planar element 38 will correspong to the cross-section 20a sensed by the follower 22 on the member 20. An annular space 40 prevails between the planar element 38 and the sheet member 30, due to the cutting width of the device 32.

If a planar element 42 corresponding to a predetermined cross-section of the member 20 were to be cut from a sheet member 44 by means of a milling cutter 46, for example, the path of this milling cutter 46 must take place with its center moving on the trajectory 48 shown in dash-dot line in FIG. 3. Under these circumstances the X-Y motions or displacements of the table 28 must be adjusted with respect to the specific dimensions sensed by the follower 22. Thus, the path 48 of the center of the milling cutter 46 has different dimensions from the exterior surface of the planar element 42. The mathematics for providing such adjustments in the X-Y displacements is well known in the art of the numerically controlled machine tool field, and such adjustments are readily handled by the computer 26. It is to be noted that since a milling cutter is not a pointed tool, but has, instead, generally a spherical-shaped cutting head, or a cylindrical-shaped cutting surface, the X-Y displacement adjustments must always be applied when using such a milling cutter. When machining three-dimensional surfaces, therefore, it is essential to apply such adjustments also to the Z direction of displacement. The mathematical computations for displacing a milling cutter and accompanying machine tool in X-Y-Z directions are considerably involved and are generally carried out by computers when using numerically-controlled machines. In accordance with the present invention, however, such involved mathematical computations are avoided, since the cutter is required to be moved only in X-Y directions for the purpose of generating a planar element. Accordingly, it is a particular advantage of the present invention that apparatus is not required for displacement in X-Y-Z directions, even though a three-dimensional surface or body is generated and constructed. As a result of subdividing the surface and body into planar elements, it is possible to confine the apparatus to displacements only in the X and Y directions.

After the planar elements have been generated in accordance with the cutting methods described above, they are stacked against each other to form the surface or body to be generated. Thus, as shown in FIG. 4, the planar elements are placed against each other to reproduce the surface or body of the member 20 as a composite of disc-shaped elements.

The planar elements 38, for example, may be attached to one another by means of an adhesive agent. In that event, the adhesive agent may be applied to a surface of the element 38, for example, by having the sheet member 30 with the cutout, serve as a mask for the adhesive application. Accordingly, to apply adhesive to a surface of the planar element 38, for example, the mask or sheet member 30 is held in position so as to enclose the element 38. Adhesive can then be spread over the element 38 readily without concern that the adhesive may inadvertently be also applied to surfaces which are not to be coated therewith. After application of the adhesive agent, for example, the mask 30 may be discarded, after use as shown in FIG. 4.

For the purpose of generating and constructing a composite body 50 of planar elements as shown in FIG. 4, it is not necessary to commence the fabrication procedure with a model or pattern 20. Instead, it is possible to specify the surface of the body to be generated in the form of mathematical equations or functions of $x$, $y$, $z$, and to insert this information into the computer 26 by means of the data input 52. Thus, the contour of a planar element 38 may be inserted and stored in the computer 26, in the form of $x$-$y$ coordinates for predetermined cross-sections of the body 50 to be generated. The finer the subdivisions and, accordingly the greater the number of cross-sections to be inserted into the computer 26, for example, the less stepped will be the surface of the body 50. Thus, a smoother surface may be obtained by subdividing the surface into a larger number of cross-sections and hence planar elements. For purposes of inserting into the computer 26, the desired displacements for the table 28, the data input 52 may be in the form of, for example, a keyboard, punched paper tape or magnetic tape.

Whereas stacking of planar elements may be accomplished by the application of an adhesive agent as shown in FIG. 4, this method of attaching the planar elements to each other may not be feasible when using metallic materials for these planar elements. Under such conditions, the method of FIG. 5 may be used, for example, in which each of the planar elements is bored to receive a bolt member 54 passing through the entire stack of elements. A nut 56 may be applied in conjunction with the bolt member 54 to firmly hold the planar elements against each other.

In lieu of the bolt member 54, another arrangement for securing the planar elements against each other in a stacked manner, may be accomplished in accordance with the embodiment of FIG. 6. In this construction, a tapered rod 58 is passed through each of the planar elements. At the same time, these elements are bored with tapered holes to mount uniquely upon the tapered rod 58. With this arrangement it is not necessary to provide bolting means, since the tapered rod 58 together with the tapered bores of the planar elements, serve to form a seizure joint, similar to the joint formed by a tapered sleeve and adaptor, for example.

In another embodiment for stacking the planar elements firmly against each other, the arrangement of FIG. 7 may be used, in which each planar element is provided with two perforations, for example. Rods of uniform cross-section may then be inserted through these perforations 60 to align and hold in place the elements in proper relationship to each other.

FIG. 8 illustrates another embodiment for obtaining proper registration in locating the planar elements relative to one another. Thus, one element 62 is provided with V-notches which are engaged by projections of an adjacent element 64, as shown in FIG. 9. The V-shaped projections and notches assure that the planar elements are properly registered or located adjacently.

For purposes of constructing dies which may be used in punch presses, for example, the arrangement of FIG. 10 may be used in which sheet elements with appropriate cutouts are stacked against each other to form the die block. As shown in FIG. 10, the female section of the die set has a cavity 66 corresponding to the shape or contour of the article to be formed by the punch press in the die set. When the cavity 66 varies in cross-section with the depth of the die section, for example, the cutout in each sheet element 68 may vary correspondingly in accordance with the respective cross sections. The planar elements or sheet members 68 may then be stacked and bolted together by bolts passed through openings 70 provided for this purpose. The fabrication of die sets in accordance with the present invention, is particularly advantageous since it avoids the use of costly die sinking machinery requiring in conjunction therewith highly skilled operating personnel.

In a further embodiment of the present invention, two planar sheets 72 and 74 are placed one on top of the other, and elements 76 and 78 corresponding to a predetermined cross section of the surface to be generated, are cut or severed simultaneously in both sheets 72 and 74. Thus, if a laser beam, for example, is used to cut or generate the elements 76 and 78 from the sheets 74, this laser beam is directed simultaneously through both sheets 74 and 72, so that a duplicate set of elements 80, 82 are cut from the sheet 72. The elements 80 and 82 correspond, respectively, thereby to elements 76 and 78. The laser beam is also used to cut sheets 72 and 74 simultaneously along parting lines 84 and 86. The function of these parting lines 84 and 86 will be described further below.

Figure 12:
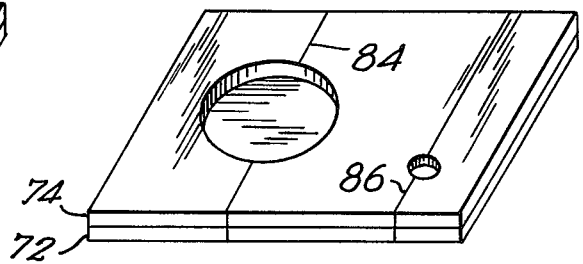
FIG. 12 is a perspective view of an intermediary step in generating a predetermined surface in accordance with the embodiment of FIG. 11.

After the laser beam has cut and generated the elements 76, 78, 80, 82, and parting lines 84 and 86, the elements 76 and 78 are removed from the sheet 74, whereas the element 80 and 82 remain in place within the sheet 72, as shown in FIG. 12.

Figure 13:
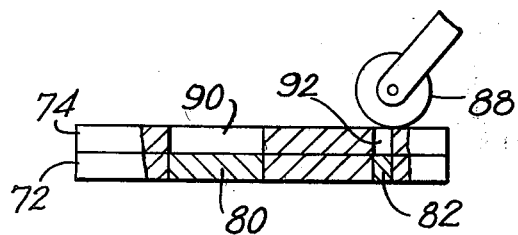
FIG. 13 is a partial sectional view and shows a subsequent step taken after the procedure illustrated in FIG. 12.

Adhesive is then applied by means of a roller applicator 88, for example, to the top surface of the sheet 74. As a result of the application of adhesive in this manner, as shown in FIG. 13, the adhesive is permitted to enter the openings 90 and 92 left vacant by the removal of the elements 76 and 78, respectively. The adhesive thereby covers the top surfaces of the elements 80 and 82 left in the sheet 72. In this arrangement, therefore, the sheet 74 serves the function of a mask for applying adhesive to the elements 80 and 82, for example.

Figure 11:
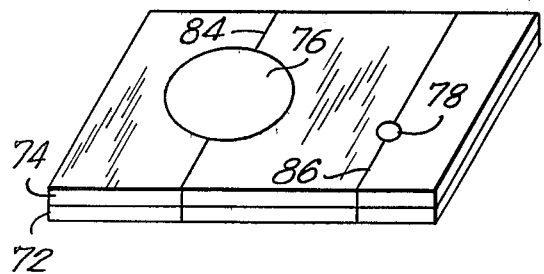
FIG. 11 is a perspective view for generating planar elements from sets of two sheets, in accordance with another embodiment of the present invention.

With adhesive agent having been applied to the top surfaces of elements 80 and 82, it is now possible to attach or cement onto these top surfaces of elements 80 and 82, an additional set elements formed in accordance with the procedure of FIG. 11 and representing the cross-section of the surface to be generated at a plane above the plane corresponding to the cross-section for elements 80, 82.

Figure 14:
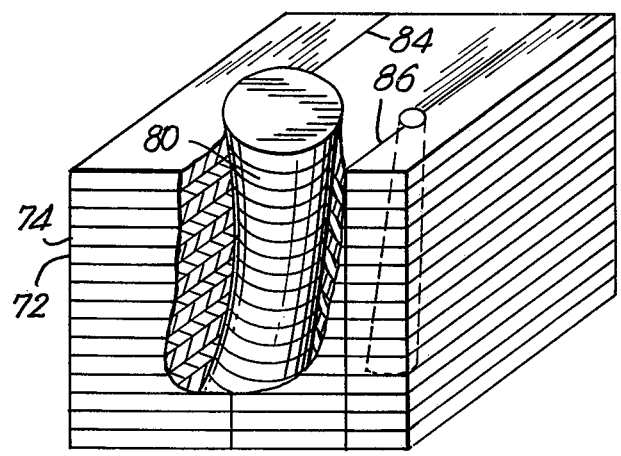
FIG. 14 is a perspective of a stacked structure obtained from the arrangement of FIGS. 11–13.

By repeating the procedure described above in relation to FIGS. 11–13, and stacking the cut sheets together with their respective elements to which adhesive has been applied, a structure such as FIG. 14 may be obtained. In this structure shown in FIG. 14, the sheets 72 and 74 are illustrated as typical cross-sections in the surface to be generated.

After stacking typical sheets such as 72 and 74 to obtain the configuration of FIG. 14, it is essential to separate portions of the stacked sheets along the parting lines 84 and 86, in order to obtain access to the stack of elements such as 80, for example, which are held together by the adhesive agent applied by the procedure of FIG. 13. Accordingly, the parting lines 84 and 86 are cut, as described previously, for the purpose of permitting removal of sections or portions of the stacked sheets to obtain the interior-generated surface comprised of elements attached to each other by adhesive agent.

Figure 15:
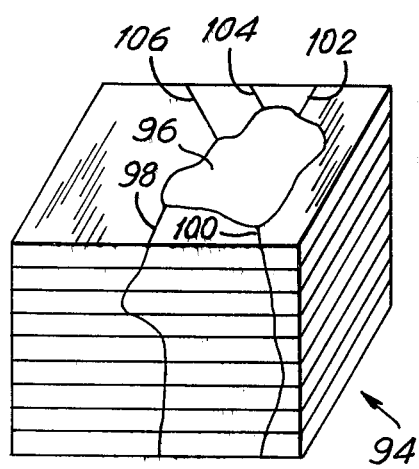
FIG. 15 is a perspective view of a stacked structure with a further complex configuration.

When the surface to be generated by elements such as 80, for example, is a surface having a substantially uniform or regular cross-section, the parting lines 84 and 86 may be relatively simple for the purpose of removing the stacked up elements attached to each other by adhesive. When, however, such stack of elements has a highly irregular cross-section, and the surface to be generated is substantially complex, the parting lines may become correspondingly complex, as shown by the structure 94 in FIG. 15. Thus, if a typical cross-section 96 of the surface to be generated, is substantially irregular as shown in FIG. 15, a series of parting lines 98, 100, 102, 104 and 106 may be essential for the purpose of removing from the interior of the structure 94, the stack of elements attached to each other by adhesive agent.

Once the internal stack of elements is removed from the structure 94 consisting of stacked sheets from which the elements have been cut, a mold of the surface generated is obtained when the portions of the structure 94 are reassembled along their parting lines. Accordingly, on the interior of the structure 94, is left a cavity or mold shaped to conform to the surface generated by the stacked elements which were removed from the interior of the structure 94. The remaining mold of structure 94 with its interior cavity comprises, thereby the negative representation of the surface generated by the stacked elements attached to each other by adhesive agent. These stacked elements comprise, thereby, the positive representation of the surface generated. Accordingly, the arrangement provided by FIGS. 11–15 results in both positive and negative representation of a surface generated by combinations of planar elements.

The negative representation may then be used as a mold to be filled with wax or other material, for example, to obtain a body with continuous surface corresponding to the positive surface representation provided by the stacked elements attached to each other with adhesive. The interior body generated from wax or other substance in plastic or metallic form, for example, may be removed similarly as described above by removing portions of the structure along the cut parting lines. In applying the negative representation of the surface in the form of the remaining stacked sheets, as shown in FIG. 15, these stacked sheets with their cutout may also have adhesive agent applied to them for the purpose of being held securely to each other.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A method for constructing a predetermined surface comprising the steps of: defining the surface to be constructed; measuring a plurality of cross-sections of said defined surface; generating a substantially planar element for each cross-section measured, each said element having a cross-section corresponding to the respective measured cross-section of said defined surface; and stacking the generated elements adjacent one another in predetermined sequence to form said surface, the sequence of the stacked generated elements corresponding to the sequence of said plurality of cross-sections of said defined surface.

2. The method as defined in claim 1 including the step of applying adhesive means between adjacent contacting surfaces of said planar elements for attaching said elements to each other.

3. The method as defined in claim 1 including the step of bolting said planar elements together.

4. The method as defined in claim 1 including the step of boring each element with a tapered opening for mounting on a tapered rod to locate and hold said elements in predetermined relationship to each other.

5. The method as defined in claim 1 including the step of forming projections and notches on the planar surfaces of said elements for joining said elements in predetermined relationship to each other.

6. The method as defined in claim 1 wherein two substantially identical planar elements are generated for each respective measured cross-section of said defined surface, said two identical planar elements being generated from two planar sheets containing said identical planar elements.

7. The method as defined in claim 6 including the steps of superimposing said two planar sheets; removing the elements in one of said sheets; applying adhesive over the entire projected area of the exposed surface of said planar sheet from which the elements has been removed; stacking a plurality of sheets with elements adhering to each other by said adhesive; cutting at least one parting line through said stacked sheets; separating portions of said stacked sheets along said parting line; and removing from the interior of said stacked sheets, said elements adhering to each other by said adhesive.

8. The method as defined in claim 7 wherein said stacked sheets after removal of said stacked elements comprises the negative representation of said surface.

* * * * *